350-96.3 SR
3/16/82 XR RE 30,883

United States Patent [19]
Rau et al.

[11] E Re. 30,883
[45] Reissued Mar. 16, 1982

[54] METHOD OF PRODUCING SYNTHETIC QUARTZ GLASS

[75] Inventors: Karlheinz Rau, Hanau; Fritz Simmat, Gelnhausen; Albert Mühlich, Frankfurt; Norbert Treber, Kriftel, all of Fed. Rep. of Germany

[73] Assignee: Heraeus Quarzscmelze GmbH, Hanau, Fed. Rep. of Germany

[21] Appl. No.: 121,078

[22] Filed: Feb. 13, 1980

Related U.S. Patent Documents

Reissue of:
[64] Patent No.: 4,162,908
Issued: Jul. 31, 1979
Appl. No.: 874,965
Filed: Feb. 3, 1978

U.S. Applications:
[63] Continuation of Ser. No. 713,541, Aug. 11, 1976, abandoned.

[30] Foreign Application Priority Data

Aug. 16, 1975 [DE] Fed. Rep. of Germany ..... 2536457
Aug. 16, 1975 [DE] Fed. Rep. of Germany ..... 2536572

[51] Int. Cl.[3] ..... C03C 17/00; C03C 17/02; C03C 25/02

[52] U.S. Cl. ..... 65/60.51; 65/3.12; 350/96.30; 427/34; 427/167

[58] Field of Search ..... 65/3 A, 18, 30 R, 60 D, 65/32, 157, 111; 427/167, 34; 350/96.30

[56] References Cited

U.S. PATENT DOCUMENTS 3,275,408 9/1966 Winterburn ..... 427/34 X
3,659,915 5/1972 Maurer et al. ..... 65/30 R X
3,778,132 12/1973 Pinnow et al. ..... 65/3 A X
3,843,229 10/1974 Rosenberger ..... 350/96.30 X
3,981,707 9/1976 Araujo et al. ..... 65/30 R X

FOREIGN PATENT DOCUMENTS 2247307 3/1974 Fed. Rep. of Germany ..... 65/3 A
2253723 7/1975 France ..... 427/34
5156641 11/1974 Japan ..... 350/96.30

*Primary Examiner*—Robert L. Lindsay, Jr.
*Attorney, Agent, or Firm*—Sprung, Felfe, Horn, Lynch & Kramer

[57] ABSTRACT

An improvement in a method for producing a synthetic hydroxyl ion-free quartz glass wherein a hydrogen free silicon compound is heated in a hydrogen-free gas stream while the gas stream is passed through an induction coupled plasma burner, the gas stream containing elemental and/or bound oxygen and the oxidation product is deposited on a refractory support as a vitreous mass, the improvement lying in including in the gas stream a gaseous hydrogen-free, thermally decomposable compound which yields fluorine in an amount of at least 500 gms. per kilogram of silica to be produced; an apparatus for producing a synthetic OH ion-free quartz glass comprising an induction coupled plasma burner which burner has disposed thereabout 3 concentric quartz glass tubes disposed in stepped configuration of which the outermost tube is the longest and the innermost tube is the shortest. The apparatus includes means for passing through the innermost tube a hydrogen-free gas stream containing elemental oxygen and/or bound oxygen together with a gaseous hydrogen free thermally decomposable compound which yields fluorine. The apparatus further contains means for passing a separating gas such as oxygen through the space defined by the innermost tube and the middle tube and the middle tube and the outermost tube.

12 Claims, 2 Drawing Figures

METHOD OF PRODUCING SYNTHETIC QUARTZ GLASS

Matter enclosed in heavy brackets [ ] appears in the original patent but forms no part of this reissue specification; matter printed in italics indicates the additions made by reissue.

This is a continuation of application Ser. No. 713,541, filed Aug. 11, 1976 and now abandoned.

BACKGROUND OF THE INVENTION

1. Field of the Invention

The invention relates to a method for the production of synthetic quartz glass, to an apparatus for the practice of the method, and to the use of the synthetic quartz glass.

2. Discussion of the Prior Art

For the manufacture of light-conductive fibers having a core and a jacket, it is desirable, especially when high-purity quartz glass is used, to have available a jacket material which has a lower refractive index than the core material. To this end it was proposed in French Patent Application No. 2,208,127 to use as the jacket material a quartz glass doped either with boron oxide or with fluorine. The fluorine-doped quartz glass is obtained by oxidizing silicon tetrafluoride in accordance with the equation $SiF_4+2H_2O+O_2 \rightarrow SiO_2+4HF$, whereby small amounts of fluorine are to be incorporated into $SiO_2$. However, the oxidation can also be brought about by reactive methods in which no hydrogen or $H_2O$ is present, such as for example in the high-frequency plasma, so that no hydrofluoric acid will form.

It is clear that it is not possible by the disclosed method to produce a fluorine-doped quartz glass in which the fluorine doping will result in a predetermined reduction of the refractive index below that of high-purity quartz glass. It is in this light that one must also interpret the statement made in U.S. Pat. No. 3,869,194, that the differences achieved in the refractive indexes of core material and fluorine-doped jacket material in a light-conductive fiber are so slight that such fibers are not suitable for optical signal transmission.

The production of synthetic quartz glass which is substantially free of "water" and thus free of absorption bands at wavelengths of 1.4, 2.2 and 2.7 μm—hereinafter referred to as "hydroxyl-ion-free"—is known from German Pat. No. 1,208,740. The hydroxyl-ion-free quartz glass is obtained by oxidizing a hydrogen-free silicon compound in a hydrogen-free gas stream containing elemental and/or bound oxygen, and depositing the oxidation product as a vitreous mass on a refractory support, the gas stream being passed through an induction-coupled plasma burner.

Accordingly, it is an object of this invention to provide a repeatable process for the production of a synthetic, hydroxyl-ion-free quartz glass especially such a quartz glass having a refractive index of $n_D \leqq 1.4570$. It is especially an object of this invention to provide such a process for the production of synthetic hydroxyl-free quartz glass having a fluorine content of at least 4 g per kg of synthesized $SiO_2$.

SUMMARY OF THE INVENTION

Broadly, this invention contemplates an improvement in a process for producing a synthetic hydroxyl ion-free quartz glass wherein a hydrogen-free silicon compound is heated in a hydrogen-free gas stream, the gas stream being passed through an induction coupled plasma burner and containing elemental and/or bound oxygen and the oxidation product is deposited on the refractory support as a vitreous mass, the improvement comprising including in said gas stream a gaseous hydrogen-free thermally decomposable compound which yields fluorine in an amount of at least 500 gms per kg of silica to be produced.

Accordingly, the objects of the present invention are achieved in a process for the production of synthetic, hydroxyl-ion-free quartz glass by oxidizing a hydrogen-free silicon compound in a hydrogen-free gas stream containing elemental and/or bound oxygen and depositing the oxidation product as a vitreous mass on a refractory support, the gas stream being passed through an induction-coupled plasma burner, by the fact that, in accordance with the invention, for the achievement of a prescribed reduction of the refractive index of synthetic quartz glass, a hydrogen-free, heat-decomposable fluorine compound in vapor form, especially dichlorodifluoromethane ($CCl_2F_2$), is introduced into the flame of the plasma burner in the amount of at least 500 g per kg of synthesized $SiO_2$.

At the same time it has been found advantageous to add the fluorine compound in vapor form to the oxygen being supplied for maintaining the flame in the plasma burner. To obtain a deposition product whose refractive index is to vary in a prescribed manner, it is advantageous to increase or decrease the amount of fluorine compound added during the depositing procedure. In such a manner there is produced a glass whose refractive index $n_D$ is 1.457 to 1.435. If, in the case of increasing the amount of fluorine compound, a rod of synthetic, hydroxyl-ion-free quartz glass is used as the refractory support and is set in motion relative to the plasma burner, by rotating it for example, during the depositing of the fluorine-doped, synthetic, hydroxyl-ion-free quartz glass, one obtains a foreproduct for the manufacture of light conducting fibers, which consists of a core of the refractory support material and a covering of fluorine-doped synthetic quartz glass.

A parabolic decrease of the refractive index in the covering is obtained if the amount of fluorine compound added is increased as the thickness of the covering increases. A light conducting fiber is then produced by drawing a foreproduct of this kind.

Instead of the rod of synthetic, hydroxyl-ion-free quartz glass, a rod of synthetic quartz glass can advantageously be used whose refractive index is increased by the addition of refractive index increasing metal ions. It is advantageous to use a doped rod of synthetic quartz glass whose refractive index decreases with distance from the rod axis. Thermally decomposable hydrogen-free-fluorine compounds which can be used according to the invention include the following: $CClF_3$, $CF_4$.

As sources of hydrogen-free silicon compound which can be used in accordance with this invention to provide hydroxyl-ion-free quartz glass one can employ the following: $SiCl_4$, $SiCl_3F$, $SiCl_2F_2$, $SiClF_3$.

Generally speaking the amount of hydrogen-free thermally decomposable fluorine compound relative to the hydrogen-free silicon compound would depend upon the nature of the glass desired and in particular the relative amount of the fluorine in the compound. Broadly speaking, however, the weight relationship of the fluorine in the thermally decomposable fluorine compound to the silicon in the hydrogen free silicon compound will be in the range of 50 to 800 gms. fluorine per kg of silicon, preferably between 150 and 300 gms. fluorine per kg of silicon.

The process is conducted by heating the hydrogen free silicon compound in the presence of the hydrogen-free gas stream containing elemental and/or bound oxygen and thermally decomposable fluorine compound at temperatures generally in the range of 1800° to 2600° C., preferably between 1850° and 2000° C. The temperatures are employed in an amount sufficient to deposit the so-heated mass upon a refractory support as a vitreous mass. The fluorine is present together with the silicon compound for a residence time of between 0.02 and 0.3 seconds, preferably between 0.04 and 0.15 seconds.

It has been found advantageous to use a burner having three quartz glass tubes disposed concentrically at some distance from one another, the outer tube overreaching the middle and innermost tube and the middle tube overreaching the innermost tube. The working gas and the silicon compound including the fluorine compound present in vapor form are fed through the innermost tube, and a separating gas, preferably oxygen, is fed through the interstice between the innermost and the middle tube and between the middle tube and outermost tube. The process of the invention differs from the state of the art particularly in that the fluorine doping of the synthetic quartz glass is no longer subject to caprice, but takes place at a specific, predetermined rate. Reductions of the index of refraction to values of 1.4532 can easily be achieved in the synthetic quartz glass produced by the process of the invention, thereby providing the assurance that this quartz glass will be suitable also for the manufacture of light-conducting fibers, especially also for those light conducting fibers whose core consists of quartz glass of high purity.

BRIEF DESCRIPTION OF DRAWINGS

Referring to the drawings herein.

DESCRIPTION OF SPECIFIC EMBODIMENTS

Figure 1:
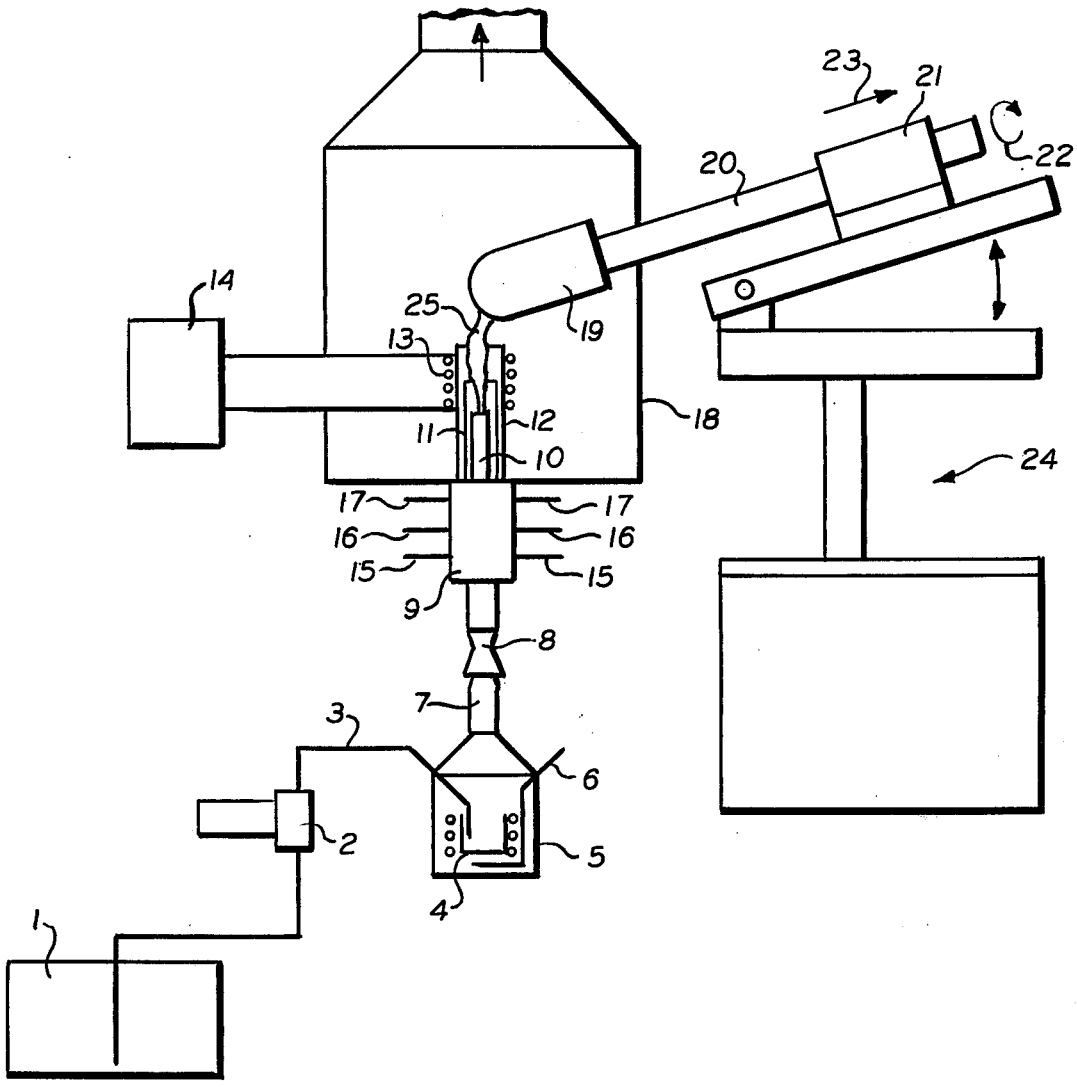
FIG. 1 is a side elevational view of an apparatus which can be employed to carry out the claimed process.

Referring to the drawings herein with the understanding that they serve to diagramatically illustrate the process of the invention, reference numeral 1 indicates a silicon tetrachloride reservoir from which the silicon tetrachloride is pumped by a proportioning pump 2 through the feed line 2 into a heated vaporizing dish 4, via line 3. Oxygen is fed into the vessel 5 containing the vaporizing dish through the line 6. The mixture of oxygen and silicon tetrachloride formed in vessel 5 is delivered through the ground-glass connection 7–8 made of quartz glass, into the plasma burner. The plasma burner is composed of a metal base 9 and the three quartz glass tubes 10, 11 and 12 which are sealed from one another and from the outside atmosphere within the metal base. The induction coil 13, which is supplied by the high-frequency electric power generator 14 is disposed about the free end of the outermost tube 12. The working gas and the two separating gases T-1 and T-2 are delivered through tangentially disposed lines 15, 16 and 17. Into the housing 18 which contains the plasma burner there extends a quartz glass piece 19, which serves as the substrate on which the fluorine-doped synthetic quartz glass is deposited. The piece of quartz glass 19 is held on a mandrel 20 in a device 21 which makes it possible to rotate and slowly draw back the piece during the depositing process, as indicated by the arrows 22 and 23. By means of the positioning system 24 it is possible to orientate the quartz glass piece 19 in all three directions with respect to the plasma flame.

The igniting of the plasma burner is performed in a conventional manner. Argon gas is introduced through the lines 15 and "ignited" by means of a tungsten rod in the vicinity of the coil 13 which is supplied with high-frequency energy. After this ignition, oxygen is slowly fed to the argon, and the argon content of the mixture is reduced until finally only oxygen is being fed. In like manner, oxygen is fed through lines 16 and 17 as separating gases T-1 and T-2.

As soon as the plasma burner is burning properly, the quartz glass piece 19 is advanced into the flame and heated with simultaneous rotation. When a temperature of about 1900° C. is reached, the vaporous mixture of silicon chloride and oxygen is fed from vessel 5 into the plasma burner and then dichlorodifluoromethane ($CCl_2F_2$) is admixed, at a rate, for example, of 0.7 kg/h, with the oxygen being introduced through line 15. Due to the high temperature of the plasma flame the $SiCl_4$ decomposes and reacts with the oxygen to form $SiO_2$, which deposits itself on the quartz glass piece 19 and vitrifies. The dichlorodifluoromethane is also decomposed by the high temperature of the plasma flame and fluorine is incorporated into the vitreous $SiO_2$ in a proportion of, for example, 5000 parts per million.

Since only gases or vapors which are free of hydrogen are used in the process of the invention, the product, fluorine-doped synthetic quartz glass, is free of hydroxyl ions.

Figure 2:
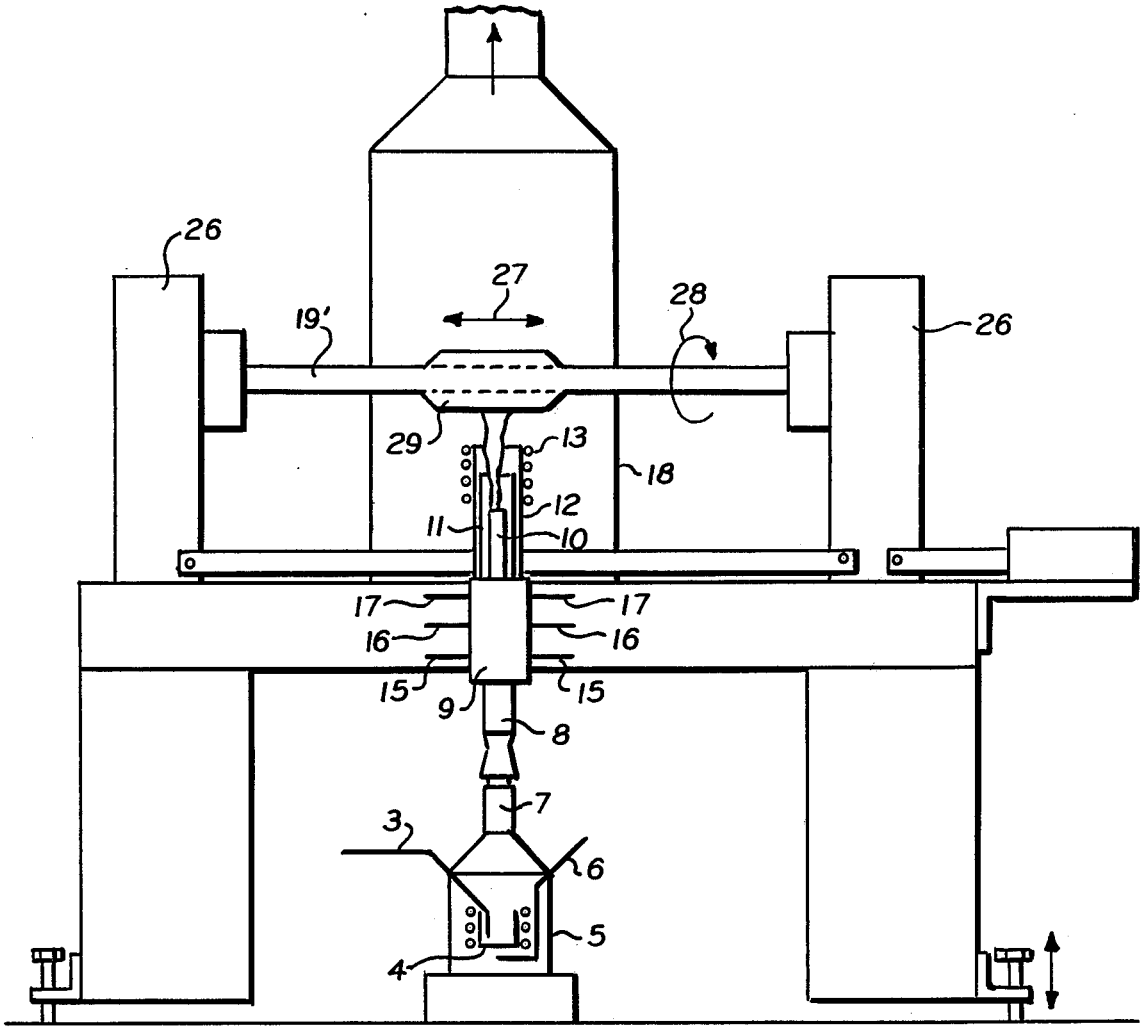
FIG. 2 is a view similar to FIG. 1 showing a further apparatus for carrying out the claimed process.

Instead of the quartz glass piece 19, a rod 19' of hydroxyl-ion-free synthetic quartz glass can be used, as represented diagrammatically in FIG. 2, which is held in end mounts 26 which are longitudinally displaceable and contain machinery for the rotation of the rod 19' (arrows 27 and 28). The fluorine-doped synthetic quartz glass is then deposited as a covering 29 on the rod 19'. The product thus obtained is a foreproduct which can then be drawn directly to form a light-conductive fiber.

The use of a plasma burner having three concentric quartz glass tubes in a stepped configuration with the outermost tube overreaching the middle and innermost tubes and the middle tube overreaching the innermost tube, and blanketing the innermost and middle tubes with a separating gas, preferably oxygen, has the advantage that no silica can collect on the burner.

What is claimed is:

1. A method for forming a coating of a fluorine containing synthetic OH ion-free quartz glass on a refractory support which comprises passing a hydrogen-free silicon compound, gaseous oxygen and vaporous $CCl_2F_2$, $CClF_3$ or $CF_4$ in a hydrogen free gas stream through an induction coupled plasma burner whereby said hydrogen-free silicon compound reacts with said oxygen to form synthetic OH ion-free quartz glass, the amount of said $CCl_2F_2$, $CClF_3$ or $CF_4$, passed through said burner, being sufficient to yield [a] fluorine [content in the quartz glass] in an amount of at least 500 grams per kg of quartz to be produced whereby there is formed a fluorine-doped synthetic OH ion-free quartz glass and depositing said fluorine-doped synthetic OH ion-free quartz glass as a coating on a refractory support.

2. A method according to claim 1 wherein said refractory support is quartz glass having a rod shape and said synthetic OH ion-free quartz glass formed by reaction of said hydrogen-free silicon compound and said oxygen is deposited thereon, the refractive index of the refractory support being increased by refractive index raising metal ions, the refractive index of said support decreasing with the distance from its axes.

3. A process according to claim 1 wherein a sufficient amount of fluorine is passed through said plasma burner together with said hydrogen-free silicon compound and elemental and/or bound oxygen, that the fluorine containing synthetic OH ion-free quartz glass has a refractory index $n_D$ of 1.457 to 1.435.

4. A method according to claim 1 wherein said refractory support is in the form of a rod shape and the resultant synthetic OH ion-free quartz glass is deposited in the form of a sleeve on said rod-shaped support.

5. A method according to claim 1 wherein $CCl_2F_2$ is admixed in vapor form with said oxygen.

6. A method according to claim 1 wherein said $CClF_3$ is admixed in vapor form with said oxygen.

7. A method according to claim 1 wherein said $CF_4$ is admixed in vapor form with said oxygen.

8. A method according to claim 1 wherein the amount of said $CCl_2F_2$, $CClF_3$ or $CF_4$ is increased as the synthetic OH ion-free quartz glass increases in thickness.

9. A method according to claim 1 wherein said hydrogen-free silicon compound is selected from the group consisting of $SiCl_4$, $SiCl_3F$, $SiCl_2F_2$ and $SiClF_3$.

10. A method according to claim 9 wherein said vaporous $CCl_2F_2$, $CClF_3$ or $CF_4$ is thermally decomposed in said plasma burner at a temperature in the range of 1800° to 2600° C.

11. A method according to claim 10 wherein said $CCl_2F_2$, $CClF_3$ or $CF_4$ is thermally decomposed in said plasma burner at a temperature between 1850° and 2000° C.

12. A method according to claim 9 wherein the weight relationship of the fluorine in said vapor $CClF_2$, $CClF_3$ or $CF_4$ to silicon in said hydrogen-free silicon compound is in the range of 50 to 800 grams fluorine per kg of silicon.

* * * * *

UNITED STATES PATENT AND TRADEMARK OFFICE

CERTIFICATE OF CORRECTION

PATENT NO. : Re. 30,883

DATED : Mar. 16, 1982

INVENTOR(S) : Karlheinz Rau et al

It is certified that error appears in the above—identified patent and that said Letters Patent is hereby corrected as shown below:

Title Page Delete "Aug 16, 1975 [DE]
Priority Fed. Rep. of Germany 2536572".

Signed and Sealed this

Eighth Day of February 1983

[SEAL]

Attest:

GERALD J. MOSSINGHOFF

Attesting Officer

Commissioner of Patents and Trademarks